Patented Dec. 26, 1939

2,184,964

UNITED STATES PATENT OFFICE 2,184,964

PROCESS OF PREPARING 2-METHYL-5-CHLOR-METHYL-6-AMINO PYRIMIDINE HYDROCHLORIDE

Gustav A. Stein, Elizabeth, N. J., assignor, by mesne assignments, to Research Corporation, New York, N. Y., a corporation of New York No Drawing. Application December 14, 1937, Serial No. 179,742

9 Claims. (Cl. 260—251)

This invention relates to a process of preparing 2-methyl-5-chlor-methyl-6-amino pyrimidine hydrochloride.

An object of the invention is the preparation of 2-methyl-5-chlor-methyl-6-amino pyrimidine hydrochloride with good yield and a pressure not substantially above atmospheric.

It is known that the above hydrochloride may be prepared by reacting 2-methyl-5-alkoxy-methyl-6-amino pyrimidine with hydrogen chloride in the presence of glacial acetic acid only at super-atmospheric pressures, and at temperatures upwards of 100° C.

I have discovered that 2-methyl-5-chlor-methyl-6-amino pyrimidine hydrochloride, having a melting point of 213–214° C., may be prepared by reacting 2-methyl-5-alkoxy-methyl-6-amino pyrimidine with hydrogen chloride in the presence of an aliphatic alcohol. The reaction occurs at atmospheric pressure and at temperatures lower than those required in the glacial acetic acid method.

The reaction may be expressed by the following equation:

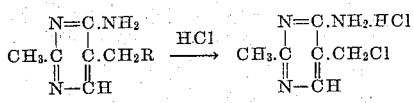

wherein R is an alkoxy group.

The compound of this invention may be used for various purposes, for example, as an intermediate in the preparation of vitamin $B_1$. The latter compound can be obtained by heating the 2-methyl-5-chlor-methyl-6-amino pyrimidine hydrochloride with 4-methyl-5-β-hydroxy ethyl thiazole for about 5 minutes at 115° C.

The following examples illustrate methods of carrying out my invention, but it is to be understood that these examples are by way of illustration and not of limitation.

Example I 10 gms. of 2-methyl-5-ethoxy-methyl-6-amino pyrimidine are dissolved in 100 cc. of butanol, and the solution is heated on the steam bath for about six hours, while passing a stream of dry hydrogen chloride through the solution. The 2-methyl-5-chlor-methyl-6-amino pyrimidine hydrochloride gradually crystallizes out. The mass is cooled, one to two volumes of ether are added, and filtered. The crystals are washed with ether and dried at about 40 to 50° C. The crude yield is about 10 gms., or 86% of theory.

Example II 10 gms. of 2-methyl-5-ethoxy-methyl-6-amino pyrimidine are dissolved in 50 cc. of butanol, and the solution is heated on the steam bath for about six hours, while passing a stream of dry hydrogen chloride through the solution. The mass is filtered, and the 2-methyl-5-chlor-methyl-6-amino pyrimidine hydrochloride is dried at about 40 to 50° C. The crude yield is about 11 gms., or 95% of theory.

Example III

The process of Example I is carried out, substituting methanol for butanol. The yield is slightly less than in Example I.

The reaction may be carried out at ordinary temperature or at elevated temperatures, elevated temperatures being preferred, because of the higher yield of product and the shorter time required for reaction.

The ethoxy group of the starting material may be replaced by other alkoxy groups, and aqueous concentrated hydrochloric acid may be substituted for the hydrogen chloride gas. When using concentrated hydrochloric acid, care should be taken that the amino group of the pyrimidine ring is not replaced by a hydroxy group. This may be prevented in various ways, for example, by heating the reaction mixture for not longer than ½ hour.

Other modifications may be made without departing from the spirit and scope of the invention and I am to be limited only by the appended claims.

I claim:

1. The process which comprises reacting a solution of a 2-methyl-5-alkoxy-methyl-6-aminopyrimidine in a lower aliphatic alcohol with hydrogen chloride.

2. The process which comprises reacting a solution of a 2-methyl-5-alkoxy-methyl-6-aminopyrimidine in butanol with hydrogen chloride.

3. The process which comprises reacting a solution of a 2-methyl-5-alkoxy-methyl-6-aminopyrimidine in methanol with hydrogen chloride.

4. The process which comprises reacting a solution of 2-methyl-5-ethoxy-methyl-6-aminopyrimidine in a lower aliphatic alcohol with hydrogen chloride.

5. The process which comprises reacting a solution of 2-methyl-5-ethoxy-methyl-6-aminopyrimidine in butanol with hydrogen chloride.

6. The process which comprises reacting a solution of 2-methyl-5-ethoxy-methyl-6-amino-pyrimidine in methanol with hydrogen chloride.

7. The process which comprises dissolving a 2-methyl-5-alkoxy-methyl-6-amino pyrimidine in a lower aliphatic alcohol and passing hydrogen chloride gas through the solution for a period of time sufficient to convert a substantial portion of said pyrimidine into 2-methyl-5-chlor-methyl-6-amino pyrimidine.

8. The process which comprises dissolving 2-methyl-5-ethoxy-methyl-6-amino-pyrimidine in butanol and passing hydrogen chloride gas through the solution for a period of time sufficient to convert a substantial portion of said pyrimidine into 2-methyl-5-chlor-methyl-6-amino-pyrimidine.

9. The process which comprises dissolving 2-methyl-5-ethoxy-methyl-6-amino-pyrimidine in methanol and passing hydrogen chloride gas through the solution for a period of time sufficient to convert a substantial portion of said pyrimidine into 2-methyl-5-chlor-methyl-6-amino pyrimidine.

GUSTAV A. STEIN.